UNITED STATES PATENT OFFICE.

RENÉ BOHN, OF LUDWIGSHAFEN-ON-THE-RHINE, BAVARIA, ASSIGNOR TO THE BADISCHE ANILIN AND SODA FABRIK, OF MANNHEIM, GERMANY.

ALIZARINE-BLUE SULPHO-ACID.

SPECIFICATION forming part of Letters Patent No. 399,480, dated March 12, 1889.

Application filed October 18, 1888. Serial No. 288,431. (Specimens.)

*To all whom it may concern:*

Be it known that I, RENÉ BOHN, a citizen of Switzerland, residing at Ludwigshafen-on-the Rhine, in the Kingdom of Bavaria and Empire of Germany, have invented new and useful Improvements in the Manufacture of Alizarine-Blue Sulpho-Acid, of which the following is a specification.

My invention relates to the manufacture of an improved dye-stuff or coloring-matter produced by the action of moderately-strong fuming sulphuric acid at an elevated temperature upon alizarine-blue.

My improved dye-stuff or coloring-matter is termed "alizarine-blue sulpho-acid" in order to indicate by this name both its chemical constitution and its general behavior, which correspond to those of a true and stable monosulphonated derivative of alizarine-blue.

In carrying out my invention I treat alizarine-blue with a moderately-strong fuming sulphuric acid of the description commonly called "Nordhausen acid" at a temperature exceeding 100° centigrade until a product soluble in much boiling water is obtained. The precise conditions of time and of temperature required for the production of such sulpho-derivative may be varied within wide limits, and are depending upon the relative proportion and strength of the fuming sulphuric acid employed. The sulphonating process may, for instance, be carried on at a temperature ranging from about 100° centigrade to 130° centigrade by employing about five parts by weight of a fuming sulphuric acid containing about twenty-three per cent. of free anhydride, while a less concentrated fuming acid requires a proportionate increase of temperature up to, say, 170° centigrade and above.

The following is an example of the manner in which alizarine-blue sulpho-acid may be conveniently prepared. About ten parts, by weight, of dry and finely-powdered alizarine-blue are gradually mixed with about fifty parts, by weight, of fuming sulphuric acid containing about twenty-three per cent. of free anhydride, and then the mixture or solution thus produced is heated up to about from 120° or about 130° centigrade during the space of about from six to eight hours, or until a sample of the product, when poured into water, yields a precipitate, which, after being filtered and washed, forms a clear green solution upon the addition of caustic potash liquor in excess, and likewise dissolves in much boiling water. The result of the operation is then poured into water, and the precipitate of alizarine-blue sulpho-acid thus obtained, after being heated up with the acid solution to about 100° centigrade, and being allowed to cool down to about 40° centigrade, is filtered, washed with cold water, pressed, and dried.

Free alizarine-blue sulpho-acid, obtained as above described, is nearly insoluble in cold water, and dissolves, as before mentioned, in much boiling water. The aqueous solution possesses a characteristic bluish-green color.

The alkaline salts of alizarine-blue sulpho-acid are readily soluble in water with a blue color, which, upon the addition of caustic potash or soda liquor in excess, changes into a bright green, no precipitation of the alkaline salt of the coloring-matter taking place. Common salt, if added in sufficient excess, precipitates the said alkaline salts, while soluble calcium or barium salts cause a separation of the corresponding saline compounds of alizarine-blue sulpho-acid.

If hydrochloric acid be added to an alkaline solution of alizarine-blue sulpho-acid, a purple crystalline precipitate of the free acid will be produced, which dissolves in an adequate excess of hydrochloric acid with a red color, no regeneration of alizarine-blue thus taking place, not even at a boiling heat. Zinc-dust reduces the coloring-matter in alkaline solution. The red solution thus produced quickly reassumes its original blue or green hue upon the access of air.

Alizarine-blue sulpho-acid dissolves in solutions of the bisulphites of potash, soda, or ammonia, and may be regenerated from the bisulphite compounds thus formed in a very pure condition by the decomposing action of acids or acid salts, especially at an elevated temperature. The said bisulphite compounds may therefore be conveniently employed for fixing alizarine-blue sulpho-acid within or upon textile fabrics or fibers with the aid of appropriate mordants in the manner practiced in the dyeing or printing processes of the analogous bisulphite compounds of alizarine-blue.

The shades which alizarine-blue sulpho-acid or the said bisulphite compounds thereof produce in dyeing or printing—say upon wool, which has received a chromium mordant—are generally of a somewhat greener hue than the corresponding shades of alizarine-blue.

What I claim as new, and desire to secure by Letters Patent, is—

As a new product, the coloring-matter or dye-stuff (alizarine-blue sulpho-acid) hereinbefore described, and having the following characteristics: In its free state it is nearly insoluble in cold water, but it dissolves in much boiling water with a characteristic bluish-green color; its alkaline salts are readily soluble in water with a blue color, which, upon the addition of caustic potash or soda liquor in excess, changes into a bright green; said alkaline salts are precipitated by the addition of common salt in sufficient excess; by the addition of hydrochloric acid to an alkaline solution of alizarine-blue sulpho-acid a purple crystalline precipitate of the free acid is produced which dissolves in adequate excess of hydrochloric acid with a red color, and alizarine-blue sulpho-acid or its bisulphite compounds produce upon chrome-mordanted wool blue shades with a greenish hue.

In testimony whereof I have hereunto set my hand in the presence of two subscribing witnesses.

RENÉ BOHN.

Witnesses:
AUGUST HANSE,
JOHANNES BÜTTNER.